(12) United States Patent
Baksh et al.

(10) Patent No.: US 7,166,151 B2
(45) Date of Patent: Jan. 23, 2007

(54) FLOW DISTRIBUTOR FOR PSA VESSEL

(75) Inventors: Mohamed Safdar Allie Baksh, Amherst, NY (US); Bernard Thomas Neu, Lancaster, NY (US); Dariush H. Zadeh, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 285 days.

(21) Appl. No.: 10/757,575

(22) Filed: Jan. 15, 2004

(65) Prior Publication Data

US 2005/0155492 A1    Jul. 21, 2005

(51) Int. Cl.
*B01D 53/04* (2006.01)

(52) U.S. Cl. .............. 96/152; 96/154; 55/418

(58) Field of Classification Search .......... 96/108, 96/135, 152, 154; 95/96; 55/418; 422/176
See application file for complete search history.

(56) References Cited

U.S. PATENT DOCUMENTS

| | | | |
|---|---|---|---|
| 4,065,391 A | 12/1977 | Farabaugh | 210/274 |
| 4,938,422 A | 7/1990 | Koves | 239/553.5 |
| 5,298,226 A | 3/1994 | Nowobilski | 422/171 |
| 5,538,544 A | 7/1996 | Nowobilski | 96/152 |
| 5,544,423 A | 8/1996 | Westelaken | 34/174 |
| 5,579,773 A | 12/1996 | Cam et al. | 96/152 |
| 5,716,427 A | 2/1998 | Andreani et al. | 95/90 |
| 5,779,773 A * | 7/1998 | Cam et al. | 96/152 |
| 5,873,929 A * | 2/1999 | Andreani et al. | 96/108 |
| 6,605,135 B2 * | 8/2003 | Lee et al. | 95/90 |

FOREIGN PATENT DOCUMENTS

EP    0748253 B1    3/1997

* cited by examiner

*Primary Examiner*—Robert A. Hopkins
(74) *Attorney, Agent, or Firm*—Mary Raynor Jimenez

(57) ABSTRACT

The present invention is a PSA system having at least one vessel that uses a multi-segmented flow distributor to provide a uniform fluid across the adsorbent bed in the vessel.

20 Claims, 8 Drawing Sheets

Ideal Flow Distribution

Actual Flow Distribution

Feed Flow

Feed Flow

Feed Flow

Feed Flow

FLOW DISTRIBUTOR FOR PSA VESSEL

BACKGROUND OF THE INVENTION

1. Field of the Invention

The invention relates to pressure swing adsorption gas separation operations. More particularly, it relates to an improved flow distribution system for pressure swing adsorption vessels.

2. Description of the Prior Art

Adsorption processes have been widely used for the separation and purification of gases. In recent years, pressure swing adsorption (PSA) systems have been developed for enhanced gas separation operations, particularly for the commercial production of oxygen and/or nitrogen from air. In the operation of PSA systems, an adsorption-desorption-repressurization processing sequence is employed, with the passage of air or other feed gas mixture at an upper adsorption pressure to an adsorption system for the selective adsorption of a more readily adsorbable component of air or other feed gas mixture by one or more adsorbent beds, and the passage through said bed(s) of a less readily adsorbable component. The bed(s) is then depressurized to a lower desorption pressure for the desorption of the more readily adsorbable component from the adsorbent bed(s), and the bed(s) is then repressurized to the upper adsorption pressure as cyclic operations are continued.

In order to fully utilize the adsorbent material employed, PSA systems require uniform flow of gas across the adsorbent bed(s) throughout the PSA processing cycle. In addition, large void volumes and pressure drops in the PSA vessel entrance and exit regions, which have adverse effects on the process performance of a PSA system, need to be mitigated in practical commercial operations. In this regard, those skilled in the art will appreciate that, in PSA systems, e.g. vacuum pressure swing adsorption (VPSA) systems, the adsorbent bed support and the flow distribution system are costly, and become more costly as the diameter of an adsorbent bed increases. The typical bed support system is also prone to adsorbent leakage if not assembled correctly. Repair of a leaking bed support system can be costly and time-consuming. Common bed designs and flow distribution systems that employ bed support plates and associated flow distribution systems, incorporating support ribs, tend to give rise to localized non-uniform gas flow, which results in an undesired penalty in gas separation performance.

In the modern PSA technology, adsorbent beds are shorter and will go through a faster cycle. They are designed smaller with little end space. The prior art distributors were not able to provide satisfactory flow distributions, with reasonable void volumes. In fact, they were not responsive to the demands of modern technology. The goal of the invention is to make the vertical PSA vessels more efficient in their separation task by achieving a better flow distribution. PSA vessels are used to capture and reduce the contaminants of chemical components such as carbon dioxide, carbon monoxide, nitrogen, oxygen, water, and hydrocarbons of the feed stream to ppm levels. This is carried out by adsorbing gases on different adsorbents such as alumina, carbon, zeolite, and molecular sieves. The adsorbent is contained in vessel and is alternated between adsorption and purge steps. A vertical vessel has generally the bed at the middle of the vessel, and has two distributors, one over the bed and one below the bed. Vertical beds can be made as tall as 25 ft with a typical diameter of 9 ft. Flow maldistribution in PSA vessels can cause early breakthrough and loss of efficiency. Flow maldistributions can also cause sieve movement and local bed fluidization.

U.S. Pat. No. 5,298,226 relates, in general, to apparatus for providing uniform fluid flow in vessels having packing materials or particulates and, in particular, to apparatus for providing uniform gas flow in pressure swing adsorbent vessels.

U.S. Pat. No. 5,538,544 relates to a non-uniform, graded ball adsorbent bed support which is employed in the head section of an adsorption vessel to achieve a uniform flow of gas to the adsorbent bed. The open areas of an inlet gas distributor are also varied to channel gas toward the edge portion of the vessel head to enhance the uniform flow of gas to the adsorbent bed.

U.S. Pat. No. 4,065,391 relates to a distributor that supplies either a liquid or a gas to a bed of granular media, such as a sand filter, is divided by inclined interior walls into primary and secondary horizontal conduits that extend parallel to each other. Gas metering orifices are positioned at an intermediate level in the inclined walls and liquid metering orifices are positioned beneath the gas metering orifices in the inclined walls. A liquid or a gas is supplied to the primary conduits, passes through the metering orifices in the inclined walls. A liquid or a gas is supplied to the primary conduits, passes through the metering orifices into the secondary conduits, and through dispersion orifices in the secondary conduits into the filter bed. At least some of the secondary conduits are each connected to at least two primary conduits so that liquid can flow from one primary conduit through a secondary conduit to another primary conduit to compensate for inequalities of flow along the primary conduits.

U.S. Pat. No. 4,938,422 relates to an inlet distributor to prevent bed surface disturbances at high inlet velocities and high particle loadings. The distributor uses a series of partitions to peel off portions of the downward gas flow and redirect them radially outward. Each outwardly directed gas flow component passes through a series of perforations to effect any necessary circumferential redistribution before entering the space above the particle bed. By subdividing the gas flow into a number of radially directed flow portions and circumferentially redistributing these flow portions, crosscurrents and eddy currents on the catalyst bed surface are minimized or avoided so that disturbances at the bed surface are eliminated. This distributor is particularly effective in vessels having particles loaded to within a short distance of bed inlets and where elbows or other upstream flow devices introduce nonuniformities into the gas flow to a particle bed. The distributor has a simple arrangement and can be used without adding significant pressure drop to the system.

U.S. Pat. No. 5,544,423 relates to a gas distributor for an inlet gas plenum comprising a plurality of spatially separate gas deflectors, each deflector arranged and positioned to successively cut diagonally across a gas flow path in a gas flow direction from an inlet and of the distributor to a terminal end of the distributor. The deflectors configured to direct gas flow exiting the distributor in an essentially perpendicular direction to the direction of gas flow entering the distributor.

European Patent Application EPO 748 253 B1 relates to a mixing assembly for gaseous flows at different temperatures, in particular for heterogeneous exothermic synthesis reactors comprising a plurality of superimposed catalytic beds and in which at least one of the beds is provided with a gas permeable wall for outlet of a flow of hot gas, said assembly including:

a baffle extending below and parallel to said gas permeable wall with which it defines a hollow space for collection of said hot gas flow;

an annular opening for outlet of said hot gas flow from said hollow space defined between said baffle and a side wall supporting said at least one bed associated wit the reactor;

a perforated distributor for a cooling gas flow supported below said baffle at a predetermined distance from said annular opening.

U.S. Pat. No. 5,716,427 relates to equipment, for example of the PSA type, which comprises gas circulation elements for passing the gas horizontally through an adsorbent (3), which comprise, on at least one vertical side of the adsorbent, a gas distribution volume comprising a first subvolume (5; 9) adjacent to the adsorbent, and a second subvolume (6; 10) separated from the first subvolume by a wall provided with passages (40) having cross-sections and/or a distribution which are selected so as to reduce the variations in local flow rate along the adsorbent. The equipment is particularly useful in separating gases from air.

U.S. Pat. No. 5,779,773 relates to a grille (26) for retaining an active material (42) in a receptacle (10) which has a convex bottom (14) delimiting an internal space within the receptacle. The grille (26) has the form of a vault and is disposed in the internal space in contact about a portion of its periphery with the internal wall of the convex bottom of the receptacle. The direction of convexity of the vault (26) and the bottom (14) are opposite to each other. Use in grilles for the support of an adsorbent material in an adsorber.

Therefore, there is a genuine need to find a better way to engender a uniform velocity across the entire cross-section of the process vessels having packing materials or particles. The enhancement of fluid distribution, i.e., improved uniformity, allows for the use of all the available reaction or separation surface area in the process vessels, thereby efficiently increasing the yield of the desired product.

It is an object of the invention to provide an improved adsorbent vessel head section capable of achieving a uniform flow of gas to an adsorbent bed therein.

It is another object of the invention to provide an improved PSA vessel capable of achieving uniform gas flow drop.

With these and other objects in mind, the invention is hereinafter described in detail, the novel features thereof being particularly pointed out in the appended claims.

SUMMARY OF THE INVENTION

The present invention relates to an adsorption system for the separation of a more readily adsorbable component of a feed fluid mixture containing said component and a less readily adsorbable component, having at least one adsorption vessel containing a bed of adsorbent material capable of selectively absorbing the more readily absorbable component of said feed fluid mixture, said vessel having a first vessel opening, a second vessel opening at the opposite end and having an inner wall; a deflector funnel having a first funnel opening at one end, a second funnel opening at its opposite end with the second opening larger than the first opening, said first funnel opening extending to form a tapered neck terminating at the second funnel opening, said first funnel opening being juxtaposed one of the vessel openings with the tapered segment being juxtaposed the inner vessel wall adjacent to said vessel opening to provide a channel between the funnel and the inner vessel wall; a perforated cap section disposed to cap the second funnel opening, said perforated cap having at its central area a porosity of less than 10% and at its circumferential area a porosity of about more than 20%, and said funnel/cap arrangement adapted for providing an effectively uniform distribution of a fluid feed to the adsorbent bed.

Another embodiment of the present invention relates to an adsorption system for the separation of a more readily adsorbable component of a feed fluid mixture containing said component and a less readily adsorbable component, having at least one adsorption vessel containing a bed of adsorbent material capable of selectively absorbing the more readily absorbable component of said fluid gas mixture, said vessel having a first vessel opening, a second vessel opening at the opposite end and having an inner wall; a distribution funnel having an inner wall spaced-apart from an outer wall to provide a fluid channel therebetween and having a first funnel opening at one end and a second funnel opening at its opposite end with the second opening larger than the first opening, the spaced walls having a perforated end at the second funnel opening and an opening end at the first funnel opening so that the spaced-apart walls provides a fluid channel in which the fluid flows from the funnel open end through the perforated funnel end; said first funnel opening extending to form a tapered neck segment terminating at the second funnel opening, said first funnel opening being juxtaposed one of the vessel openings with the tapered segment being adjacent to the vessel inner wall; a perforated cap section disposed to cap the second funnel opening, and said funnel/cap arrangement adapted for providing an effective uniform distribution of a fluid feed to the adsorbent bed.

DETAILED DESCRIPTION OF THE INVENTION

The present invention lies in the recognition that an improved uniform fluid relocating can be achieved across the entire or substantially entire cross-section of a process vessel by using at least two particularly designed fluid distributor components with at least one component being perforated and/or arranging at least two particularly designed fluid distributor components in a particular manner in the process vessel.

The distributor components according to the invention are simple in design and bed support can be eliminated by particle supported with ceramic particles in voids. In addition, significant end space volume reduction (<5%) can be achieved using the flow distributor of this invention relative to prior art generally having endspace void volume of about 15%. Such a reduction in endspace void volume result in enhanced (>5%) product recovery, reduction in adsorbent inventory and power consumption of the PSA processes.

Figure 5A:
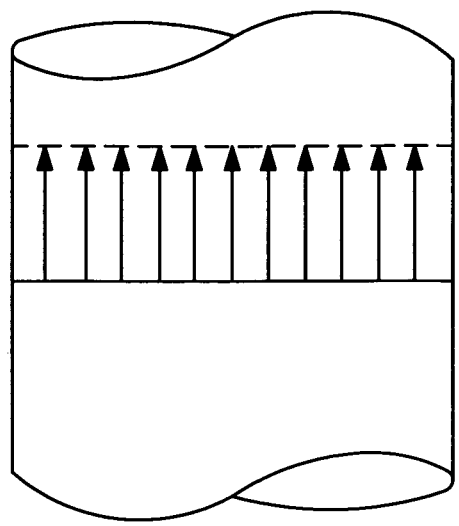
FIG. 5A is a schematic of an ideal flow distribution.
Figure 5B:
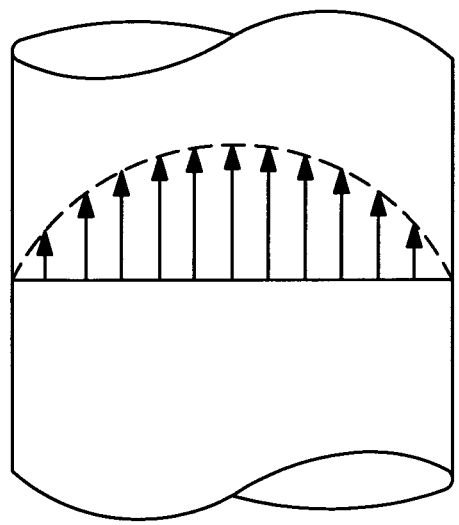
FIG. 5B is a schematic of an actual flow distribution without any distributor means.

FIG. 5A shows the ideal flow distribution for a fluid flow to adsorber bed in a vessel. FIG. 5B shows a flow distribution of a fluid flow to an adsorber bed without using distributors. The novel distributor of the invention will provide an effective distribution approaching the ideal flow distribution of FIG. 5A.

Figure 1:
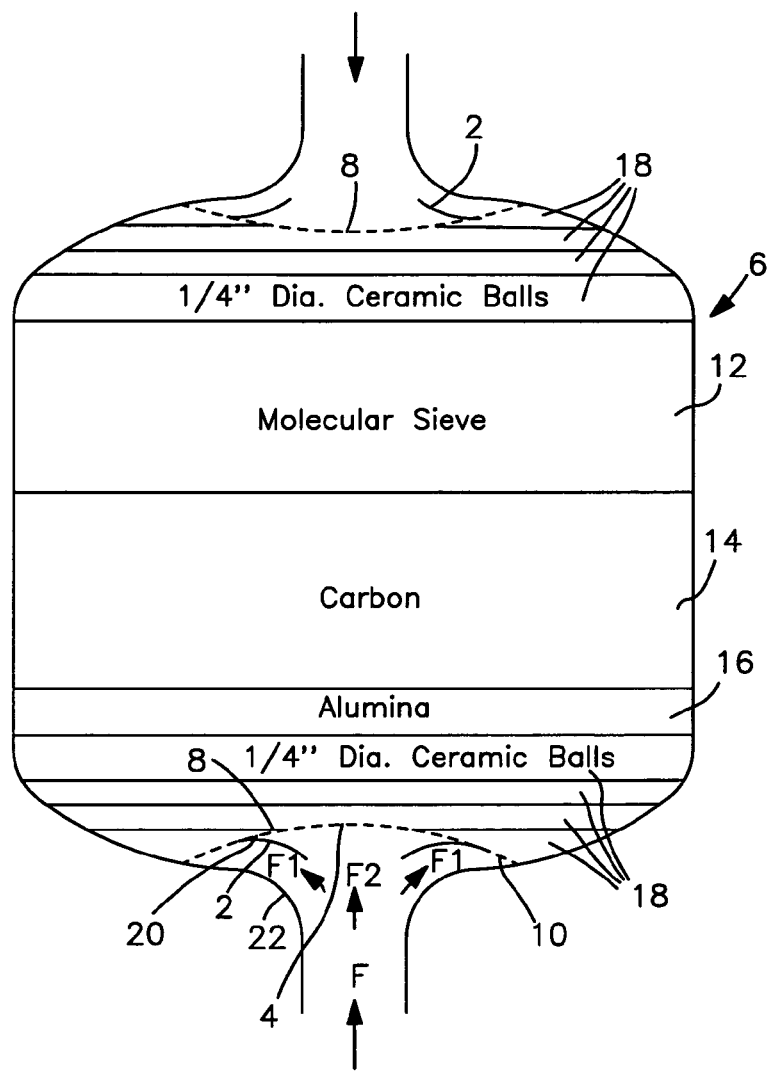
FIG. 1 is a longitudinal cross-sectional view of an adsorber provided with a flow distributor arrangement according to the invention.
Figure 2:
FIG. 2 is a perspective view of a funnel deflector used as a compound for the flow distributor according to the invention.
Figure 3:
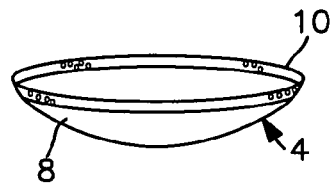
FIG. 3 is a perspective view of a semi-spherical plenum cap used as a component for the flow distributor according to the invention.

FIG. 1 shows novel flow distributor components 2 and 4 for a small or medium size vessel 6. Distributor component 2 is a funnel shaped deflector as shown in FIG. 2. The funnel deflector can be solid. Distributor component 4 is a semi-spherical plenum cap as shown in FIG. 3. The cap 4 has a low porosity at its center area 8 defined as the radial area of between about 70% and about 95% of the radius measured from its center point and the remaining circumferential area 10 has a high porosity. Porosity is defined as the total opened area occupied by the perforated holes divided by the total areas occupied by the solid and perforated sections (i.e. holes and non-holes regions). The porosity at the central area can vary between about 0.05% and about 10%, preferably between about 0.1% and 5% and more preferably between about 0.15% and 0.25%. The porosity at the circumferential area can vary between about 20% and about 80%, preferably between about 40% and about 60%, and more preferably between about 45% and 55%.

Figure 6:
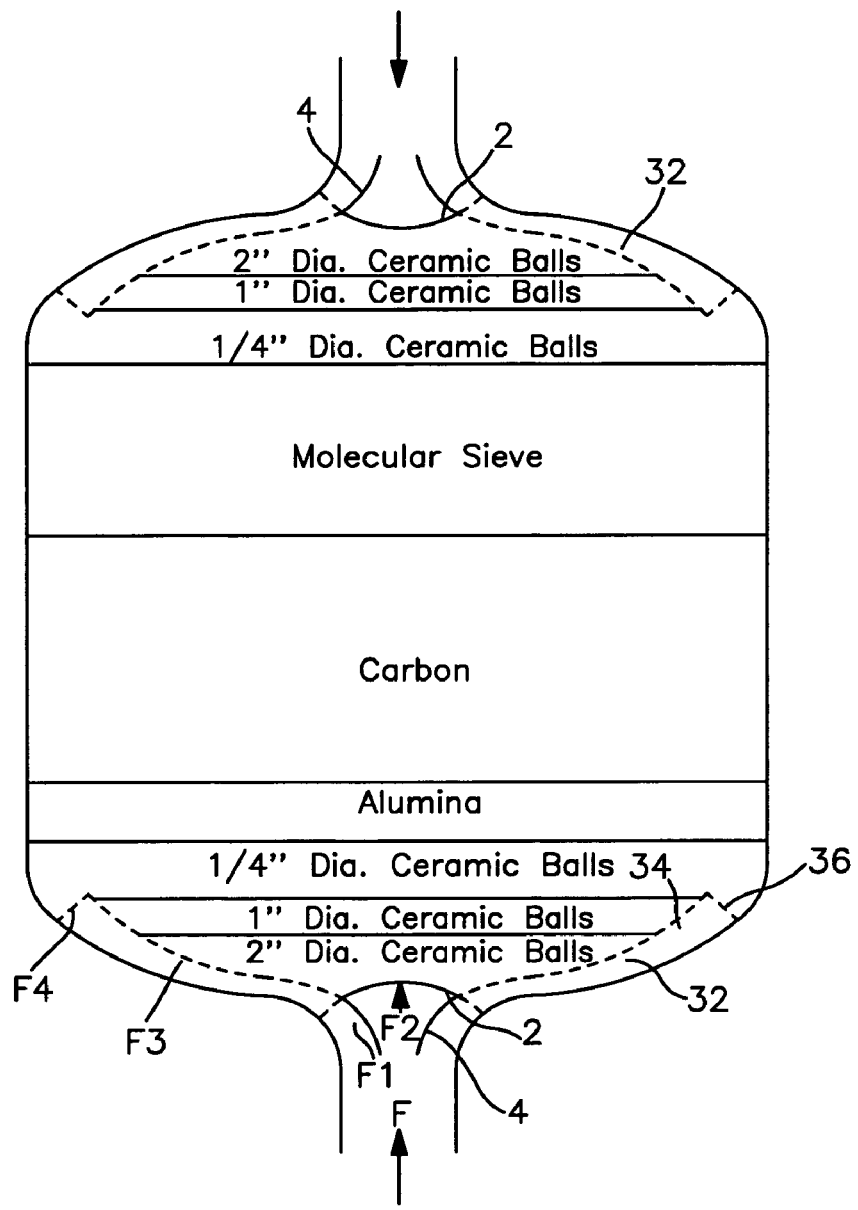
FIG. 6 is a longitudinal cross-sectional view of an adsorber provided with an embodiment of a flow distributor arrangement having a perforated exterior component according to the invention.
Figure 7:
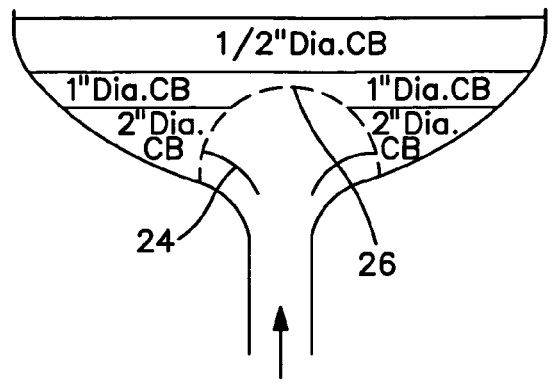
FIG. 7 is a partial longitudinal cross-sectional view of a small diameter vessel using the components of FIGS. 2 and 3 is the flow distributor according to the invention.
Figure 8:
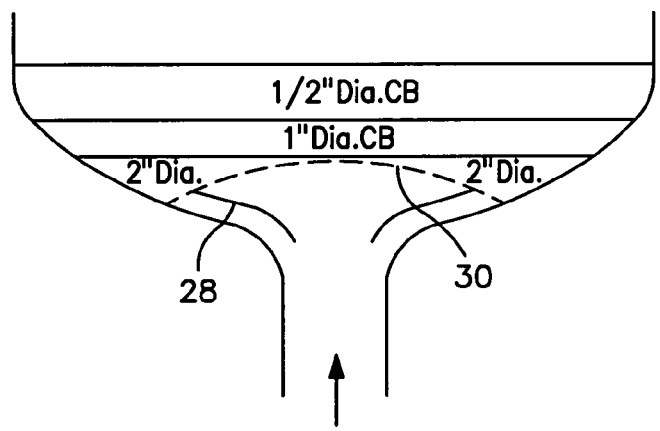
FIG. 8 is a partial longitudinal cross-sectional view of a medium diameter vessel using the components of FIGS. 2 and 3 as the flow distributor according with the invention.
Figure 9:
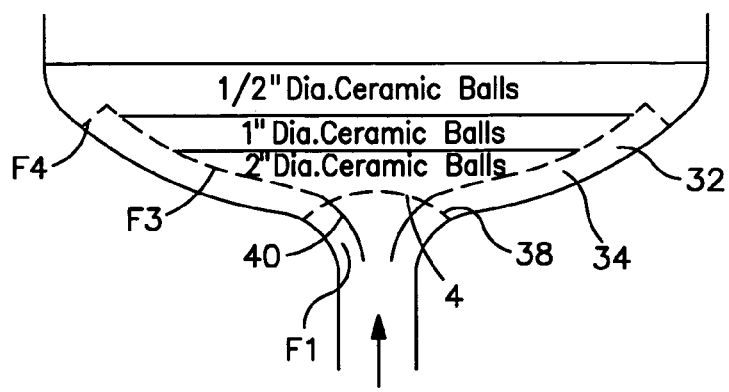
FIG. 9 is a partial longitudinal cross-sectional view of a large diameter vessel using the components of FIGS. 2, 3 and 4 as the flow distributor according with the invention.

The same components in the various drawings have the same reference numbers. In the practice of the invention, the funnel component 2 divides the total flow of a fluid F into two parts, segment F1 and segment F2. The flow F2 goes through the funnel 2 then passes through the low porosity area 8 of the cap 4 and then reaches the adsorbent bed assembly composing of one or more layers of adsorbents. For example, the adsorbent bed consists of three layers of adsorbents, such as a layer molecular sieve 12, a layer of carbon 14, and a layer of aluminum 16 all sandwiched between a multi layer of various size ceramic balls 18. The ceramic balls 18 can provide support for the distributor components. The flow F1 runs between the other side 20 of funnel 2 and the vessel wall 22 and passes through the high porosity area 10 and then to the adsorbent bed. As shown in FIG. 7, the shape and location of the funnel 24 and the perforated cap 26 are for a small diameter vessel generally having a diameter of between 6 to 78 inches. As shown in FIG. 8, the shape and location of the funnel 28 and the perforated cap 30 are for a medium diameter vessel generally having a diameter of between 78 and 100 inches. Note that the radius of the semi-spherical plenum cap 26 for the small vessel is smaller than the radius of the semi-spherical plenum cap 30 for the medium vessel. For vessels exceeding 100 inches, a flow extender 32, as shown in FIGS. 6 and 9, can be used. The flow extender 32 is porous and has an inner porosity area 34 and a circumferential high porosity area 36. As shown in FIG. 9, the flow F1 is divided into a flow F3 which passes through low porosity area 34 and a flow F4 which passes through high porosity area 36 and both providing an effective uniform flow to the adsorbent bed. The porosity at the area 34 can be between about 0.05% and about 10%, preferably between about 0.1% and about 5%, and more preferably between about 0.7% and about 0.9%. The porosity of the circumferential area 36 can be between about 20% and about 80%, preferably about 40% and about 60%, and more preferably between 45% and about 55%. As shown in FIGS. 6 and 9, the low porosity area 32 is parallel and juxtapose the inner wall of the vessel head and the high porosity area 38 is disposed at the circumferential edge of funnel 40.

Figure 11:
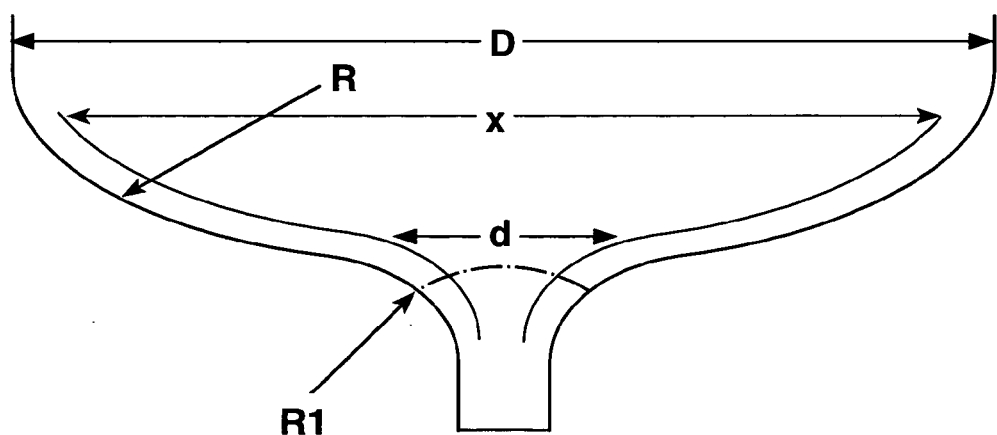
FIG. 11 illustrates replication of components in a vessel.

To illustrate the variables of D, d and x for the distributor components and the size of the vessel, the replication of the components in a vessel is illustrated as shown in FIG. 11.

As shown in FIG. 11, D is the vessel diameter, d is the span of the semi-spherical plenum cap, and x is the span of the flow extender.

In the most preferred mode of operation, the length of the semi-spherical plenum cap, d will be greater than 50% of the vessel diameter D, the radius of curvature of the semi-spherical cap is between 10% and 60%, preferably about 15% of the vessel diameter if extender is used and between about 50% and 95%, preferably about 75% of the vessel diameter without the flow extender. In the case using the flow extender, x will be about 80–90% of the vessel diameter. The thickness of the region between extender and the vessel head where the gas flows will be about 7% of the vessel diameter, and the radius of the neck region of the vessel head will be about 15–20% of the vessel diameter. In addition, the extender starts at the semi-spherical cap and extends along the vessel head towards the knuckle region of the vessel. The vessel head consists of an inlet pipe with a diameter of about 5–20% of the vessel diameter, a neck region (where the inlet pipe meets the vessel) having a radius R1 of curvature of about 15–20% of the vessel diameter D, an elongated section having a radius (R) of about 90% of the vessel diameter and connects the knuckle with the neck region of the bed, and a knuckle section (radius is about 15–20% of the vessel diameter) that connects the uniform diameter section of the vessel with the header.

Several cases using different values of D, d and x were studied to evaluate the performance of the new flow distributors.

The first case (case 1) having d/D=35.2%, utilized a flow distributor having D=102 inches, d=35.9 inches and without the flow extender. In this case, the flow maldistribution was greater than 10%, such maldistribution being defined as the ratio of maximum speed of flow after ceramic balls and at the beginning of bed to the average speed of flow at the same level.

The second case (case 2) having d/D=66.6% utilized a flow distributor having D=102 inches, d=68 inches and without the flow extender. In this case, the flow maldistribution was less than 5%.

The third case (case 3) having x/D=83.3% utilized a flow distributor having D=102 inches, x=85 inches and with the flow extender. In this case using the flow extender, the flow maldistribution was less than 5%.

Based on the aforementioned three cases and additional computer simulations, design guidelines were established for flow distributors to be preferably used in all vessel sizes. The design guidelines are as follows:

Case 1—without flow extender, flow maldistribution (high>10%) is unavoidable with d/D<50%.
Case 2—without flow extender, acceptable flow maldistribution (less than 10%) is achieved when d/D≧50%.
Case 3—with flow extender, acceptable flow maldistribution (less than 10%) is achieved when X/D>75%.

Table 1 gives several examples using the novel flow distributor components to achieve low flow maldistribution.

TABLE 1

Vessel Specification With and Without Flow Extender

| Vessel Diameter, D Inch | Without Extender Range | Without Extender Best Mode | With Extender Range | With Extender Best Mode |
|---|---|---|---|---|
| 60 | d ≧ 30" | d = 40" | x ≧ 45" | x = 50" |
| 78 | d ≧ 39" | d = 52" | x ≧ 59" | x = 65" |
| 96 | d ≧ 48" | d = 64" | x ≧ 72" | x = 80" |
| 114 | d ≧ 57" | d = 76" | x ≧ 86" | x = 95" |
| 122 | d ≧ 61" | d = 81" | x ≧ 92" | x = 102" |
| 129 | d ≧ 65" | d = 86" | x ≧ 97" | x = 107" |

Figure 4:
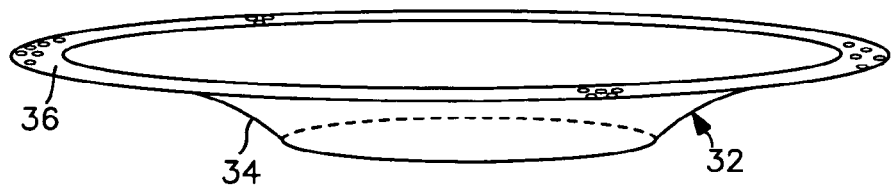
FIG. 4 is a perspective view of a perforated flow extender used as a component for another embodiment of a flow distributor according with the invention.

The preferred porosities for the low and high sections 8 and 10 of the semi-spherical cap as shown in FIG. 3, are about 0.2% and about 50%, respectively. The preferred porosities for the low and high sections 34 and 36 of the flow extender as shown in FIG. 4 are about 0.8% and about 50%, respectively.

Table 2 shows the hole sizes and the spacing between the holes to achieve the aforementioned porosities.

TABLE 2

Hole Sizes and distance between holes to achieve aforementioned porosities

| Hole Size, in. | Distance between Holes on the Middle part 8 of the Distributor Cap (porosity = 0.2%) | Distance between Holes on the Middle part 34 of the Flow Extender (porosity = 0.8%) | Distance between Holes on the External part 8 of the Distributor Cap (porosity = 50%) | Distance between Holes on the External part 36 of the Flow Extender (porosity = 50%) |
|---|---|---|---|---|
| ⅛" | 3.96" | 1.98" | 0.25" | 0.25" |
| ¼" | 4.95" | 2.48" | 0.31" | 0.31" |
| ½" | 9.91" | 4.95" | 0.63" | 0.63" |
| 1" | 19.82" | 9.91" | 1.25" | 1.25" |

Referring to Table 2, using ¼" holes for the perforation, and 4.95" center-to-center distance between the holes at the center of cap was required to provide the desirable and preferably 0.2% central porosity of a semi-spherical cap. Using the same size hole, an approximate 0.31" distance between holes was required to provide the desirable and preferably 50% edge porosity of the cap. Using the same size range holes, an approximate ¼" to 1.25" (column 4) distance between holes is required to provide the desirable 50% edge porosity of the cap. Using the same size range for the perforation of flow extender, an approximate 2" to 10" (column 3) center-to-center distance between the holes at the central part of the flow extender is required to provide the desirable and preferably 0.8% central porosity of the extender. For the cap, an approximate ¼" to 1.25" (column 5) distance between holes is generally required to provide the desirable and preferably 50% edge porosity of the extender. Therefore, using holes from ⅛" to 1", the distance between holes can range from 0.25 to 20 inches on the cap and flow extender. The porosity on the cap and flow extender can be variable depending on the vessel, the application and therefore can range from 0.1% to 80%.

Figure 10A:
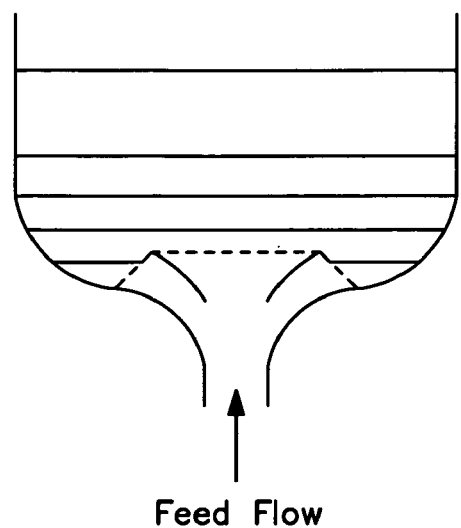
FIGS. 10A through 10D are partial longitudinal cross-sectional views of various embodiments of flow distributors according to the invention.
Figure 10B:
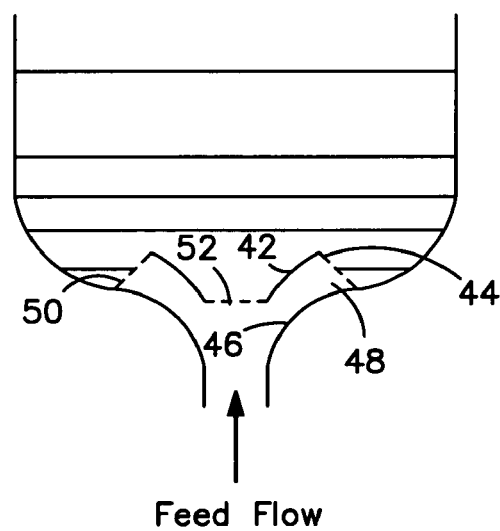
Figure 10C:
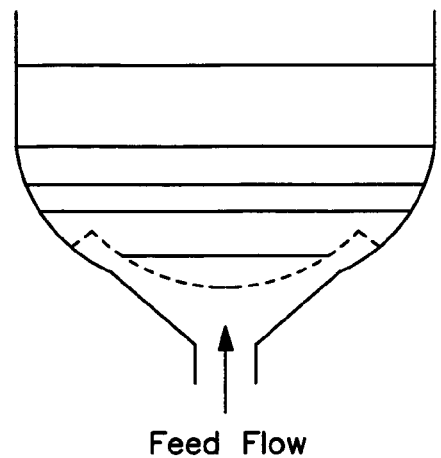
Figure 10D:
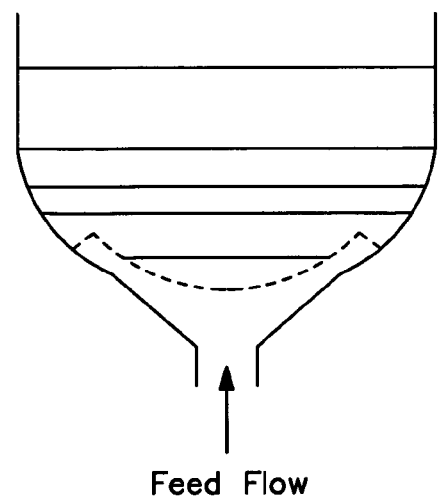

FIG. 10*a* through FIG. 10*c* show alternative embodiments of distributor components to provide an effective uniform fluid flow distribution of the type shown in FIG. 5*a*. These embodiments do not use a flow extender and some use funnels having spaced-apart walls to permit a channel to direct a portion of a fluid flow along the inner wall of the vessel. For example FIG. 10B, a funnel 42 with spaced-apart walls 44 and 46 forming channel 48. The upper end 50 of funnel 42 has a perforation closure with a high porosity of between about 20% and 80%. A perforated plate cap 52 for the funnel 42 has a low porosity of between about 0.05% and 10%. The other embodiments 10A, 10C and 10D have similar components operating in the same was as FIG. 10B.

The relatively high flow maldistributions that exist in prior are flow distributors can create sieve movement and dusting due to high gas velocity across the surface of the adsorbent. Such movement and dusting of adsorbents in PSA vessels can cause valves failure and destruction of pumps and compressors resulting in plant shut down. Typically, in PSA vessels, sieve (adsorbent) movement over the surface of the bed will start at about 38 ft/s velocity above the bed. The speed over bed can locally increase and reach high values due to flow maldistribution. The bed can locally increase and reach high values due to flow maldistribution. The maximum speed of purge flow over the bed with the standard flow distributor is about 4–6 ft/sec which could be cut to less than 1 ft/sec with the novel distributor design. This feature becomes crucial when the bed size is reduced to provide an efficient process. The quantity of purge flow generally does not generally affect the flow maldistribution.

The invention provides a significant advance in the field of PSA and other adsorption processing for commercially significant air and other gas separation operations. By conveniently enabling more uniform gas flow across in adsorbent bed to be achieved, the invention enables the full adsorptive capacity of the adsorbent bed to be effectively utilized. Large void volume and/or pressure drop requirements in the vessel head are thereby mitigated, and enhanced overall performance of the highly desirable adsorption processes is advantageously in practical commercial operations.

Although the distributor components and their arrangement in a fixed bed vessel have been described in detail in reference to certain embodiments, those skilled in the art will recognize that there are other embodiments of the invention within the spirit and scope of the claims.

The invention claimed is:

1. An adsorption system for the separation of a more readily adsorbable component of a feed fluid mixture containing said component and a less readily adsorbable component, having at least one adsorption vessel containing a bed of adsorbent material capable of selectively absorbing the more readily absorbable component of said feed fluid mixture, said vessel having a first vessel opening, a second vessel opening at the opposite end and having an inner wall; a deflector funnel having a first funnel opening at one end, a second funnel opening at its opposite end with the second opening larger than the first opening, said first funnel opening extending to form a tapered neck terminating at the second funnel opening, said first funnel opening being juxtaposed one of the vessel openings with the tapered segment being juxtaposed the inner vessel wall adjacent to said vessel opening to provide a channel between the funnel and the inner vessel wall; a perforated cap section disposed to cap the second funnel opening, and said funnel/cap arrangement adapted for providing an effectively uniform distribution of a fluid feed to the adsorbent bed.

2. The adsorption system of claim 1 wherein the perforated cap is a circular cap and has a center area defined as the radial area of between about 70% and about 95% of the radius measured from its center and a circumferential area being the remaining area.

3. The adsorption system of claim 2 wherein said center area has a porosity of less than about 10% and said circumferential area has a porosity of more than about 20%.

4. The adsorption system of claim 2 wherein said center area has a porosity of between 0.05% and about 10%.

5. The adsorption system of claim 2 wherein said circumferential area has a porosity of between about 20% and about 80%.

6. The adsorption system of claim 1 wherein a perforated flow extender component is added and disposed juxtaposed to the inner wall of the vessel abutting the deflector at its widest rim.

7. The adsorption system of claim 6 wherein the perforated flow extender component has at least a side wall with a porosity of between about 0.05% and about 10%.

8. The adsorption system of claim 7 wherein the perforated flow extender component has its widest rim with a porosity of between about 20% and about 80%.

9. The adsorption system of claim 6 wherein said center area of the cap has a porosity of less than about 10% and said circumferential area of the cap has a porosity of more than about 20%.

10. The adsorption system of claim 1 wherein the perforated cap and deflector funnel are supported by a bed of balls.

11. The adsorption system of claim 6 wherein the perforated cap, deflector funnel and extender component are supported by a bed of balls.

12. An adsorption system for the separation of a more readily adsorbable component of a feed fluid mixture containing said component and a less readily adsorbable component, having at least one adsorption vessel containing a bed of adsorbent material capable of selectively absorbing the more readily absorbable component of said fluid gas mixture, said vessel having a first vessel opening, a second vessel opening at the opposite end and having an inner wall; a distribution funnel having an inner wall spaced-apart from an outer wall to provide a fluid channel therebetween and having a first funnel opening at one end and a second funnel opening at its opposite end with the second opening larger than the first opening, the spaced walls having a perforated end at the second funnel opening and an opening end at the first funnel opening so that the spaced-apart walls provides a fluid channel in which the fluid flows from the funnel open end through the perforated funnel end; said first funnel opening extending to form a tapered neck segment terminating at the second funnel opening, said first funnel opening being juxtaposed one of the vessel openings with the tapered segment being adjacent to the vessel inner wall a perforated cap section disposed to cap the second funnel opening, and said funnel/cap arrangement adapted for providing an effective uniform distribution of a fluid feed to the adsorbent bed.

13. The adsorption system of claim 12 wherein the perforated cap is a circular cap and has a center area defined as the radial area of between about 70% and about 95% of the radius measured from its center and a circumferential area being the remaining area.

14. The adsorption system of claim 12 wherein the perforated cap has a porosity of less than about 10% and more than about 0.05%.

15. The adsorption system of claim 13 wherein said center area has a porosity of between about 0.05% and about 10% and said circumferential area has a porosity of between about 20% and about 80%.

16. The adsorption system of claim 12 wherein a perforated flow extender component is added and disposed juxtaposed to the inner wall of the vessel abutting the deflector at its widest rim.

17. The adsorption system of claim 16 wherein the perforated flow extender component has at least a side wall with a porosity of between about 0.05% and about 10%.

18. The adsorption system of claim 17 wherein the perforated flow extender component has its widest rim with a porosity of about 20% and about 80%.

19. The adsorption system of claim 18 wherein the funnel at its widest top rim area has porosity of between about 20% and about 80%.

20. The adsorption system of claim 12 wherein the perforated cap and deflector funnel are support by a bed of balls.

* * * * *